United States Patent

[11] 3,633,383

[72] Inventor Hans-Joachim Kleinschmidt
       Essen, Germany
[21] Appl. No. 14,436
[22] Filed Feb. 26, 1970
[45] Patented Jan. 11, 1972
[73] Assignee Gelenkwellenbau G.m.b.H.
       Essen, Germany
[32] Priority Feb. 28, 1969
[33] Germany
[31] P 19 10 284.2

[54] UNIVERSAL SHAFT
    9 Claims, 1 Drawing Fig.

[52] U.S. Cl............................................. 64/23
[51] Int. Cl............................................. F16d 3/06
[50] Field of Search.............................. 64/23, 17;
                                                    287/53; 277/207

[56]        References Cited
         UNITED STATES PATENTS
2,239,192  4/1941  Cutting........................ 64/23 X
3,367,142  2/1968  Groves et al................. 64/23
3,470,711  10/1969 Kayser......................... 64/17
3,504,936  4/1970  Brown et al.................. 64/23 X Primary Examiner—Edward G. Favors
Attorneys—Curt M. Avery, Arthur E. Wilfond, Herbert L. Lerner and Daniel J. Tick ABSTRACT: Universal shaft includes two shaft portions having respective inner ends splined to one another so that the portions are nonrotatable though axially displaceable relative to one another, the surface material of at least one of the portions at the splined connection having relatively good antifriction and wearing properties, sealing means surrounding the splined portions and enclosing a lubricant-filled inner chamber for the splined connection, the sealing means including a sealing ring and a scraper ring located adjacent and coaxial to one another, the scraper ring having a scraping end facing outwardly, and a permanently lubricated swivel joint carried by each of the shaft portions at respective outer ends thereof.

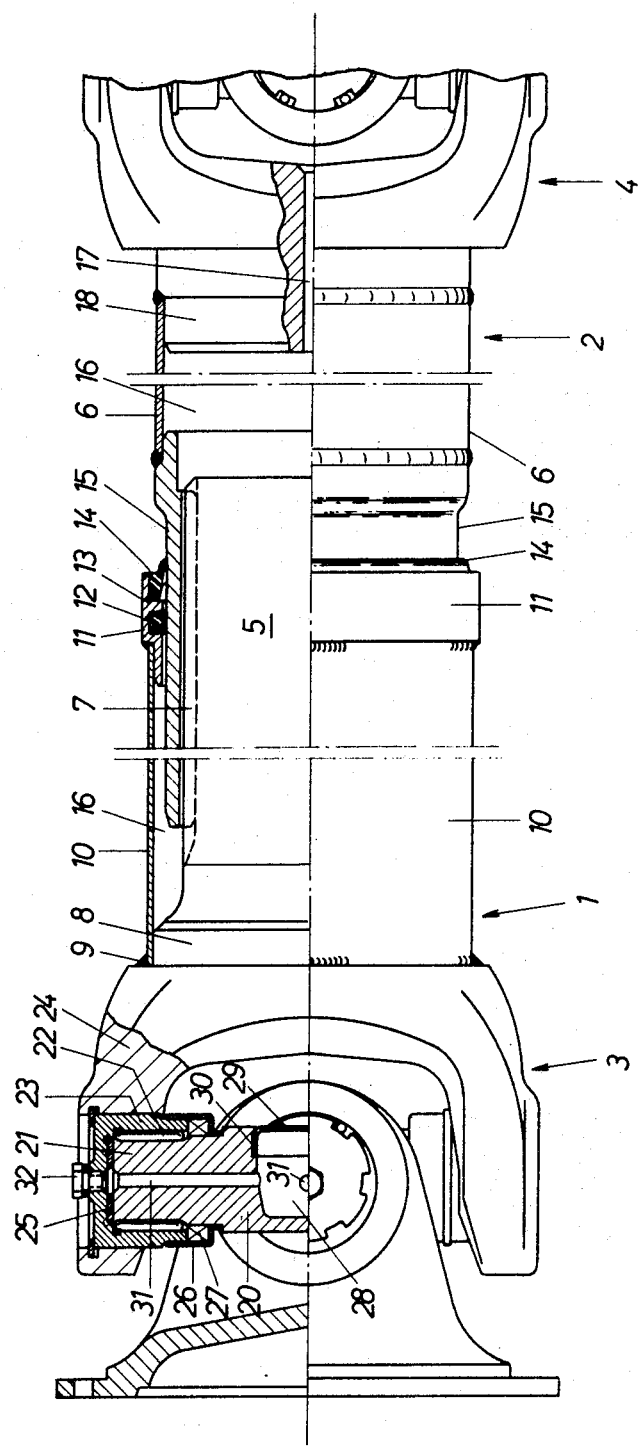

UNIVERSAL SHAFT

My invention relates to universal shaft and more particularly to such universal shaft which includes two shaft portions having respective inner ends splined to one another so that the shaft portions are axially displaceable but nonrotatable relative to one another, a contact seal for sealing a lubricant-filled inner chamber for the splined connection, and a swivel joint carried by at least one of the shaft portions at the other end thereof.

It has been known also to coat load-transmitting tooth profiles or the like with a suitable plastic material to provide relatively good antifriction and wearing properties.

Furthermore, swivel joints which require no servicing throughout their lifetime have been known heretofore.

It is an object of my invention to provide universal shaft which requires no maintenance throughout its serviceable lifetime and has a relatively great durability as compared to heretofore known universal shaft of this general type.

With the foregoing and other objects in view I provide, in accordance with my invention, universal shaft comprising in combination two shaft portions having respective inner ends splined to one another so that the portions are nonrotatable though axially displaceable relative to one another, the surface material of at least one of the shaft portions at the splined connections between the shaft portions having relatively good antifriction and wearing properties; sealing means surrounding the splined shaft portions and enclosing a lubricant-filled inner chamber for the splined connection, the sealing means including a sealing ring and a scraper ring located adjacent and coaxial to one another, the scraper ring having a scraping end facing outwardly and being scrapingly in engagement with one of the shaft portions; and a permanently lubricated swivel joint carried by each of the shaft portions at respective outer ends thereof.

In the universal shaft of the type of my invention, the interior of the splined connection and the lubricant storage spaces of the swivel joints require only a single filling with lubricant which lasts for the entire working life of the shaft.

The result of providing at least the surface of one of the shaft portions at the splined connection between the shaft portions with relatively good antifriction and wearing properties, such as by coating the splined teeth of the universal shaft with a plastic material such as nylon, for example, or by hardening the splined teeth by an inductive process or by soft nitriding, for example, reduces wear of the splined connection while minimizing lubricant consumption and ensuring satisfactory emergency operating properties. These properties of the splined teeth are of great importance because, after the universal shaft joint has been in operation for a relatively long time, the quantity of lubricants previously supplied thereto may have decreased to such an extent that it would be inadequate to lubricate the splined teeth treated in any other manner.

The scraper ring according to my invention serves to push away from the surface of one of the shaft portions the bulk of the dirt accumulated thereon, so that the sealing ring proper of the invention always slides on a smooth precleaned surface. The scraper ring also protects the sealing ring from other damaging external effects.

In accordance with a further feature of the invention and in order to effect a relatively good sealing of the universal shaft, the sealing ring is formed with a substantially square-shaped cross section. Such a sealing ring having a substantially square cross section is provided in accordance with my invention with a sealing lip at each corner of the square cross section, and a recess is provided at each lateral edge of the square cross section.

In accordance with another feature of the invention and in order to provide a maintenance-free embodiment of the swivel joints, the swivel joints are universal joints having spider members supported by means of cup-shaped bearing bushings on fork arms of the swivel joints, a lubricant chamber being located at the center of each of the spider members, the lubricant chamber being sealed by a closure member and communicating through a respective lubricating channel with a respective bearing space for the spider members. When the spider members of the swivel universal joints are assembled, the lubricant chamber is filled with the lubricant and then sealed by the closure member which is, for example, secured by adhesive therein. The lubricant chamber is provided with sufficient vacuum for receiving lubricant in a quantity adequate for lubricating the universal joint pivot pin bearings for the entire servacable life of the joint so as to eliminate the necessity for the maintenance thereof.

In accordance with an added feature of the invention I provide floating end plates formed with lubricant pockets on both sides thereof and consisting of a heat-stabilized, highly crystalline and heat-resistant plastic material through which the pivot pins of each of the spider members of the universal joints bears on the bases of the cup-shaped bearing bushings. By means of this type of pivot pin mounting, the heretofore frequent freezing of the faces of the pivot pin and the base of the bushings is precluded. This feature thereby contributes towards maintenance-free construction of the universal shaft.

Due to the exceptionally good sealing action produced by the means for sealing the splined connection, the air pressure in the space closed by the two shaft portions may become excessive when the two shaft portions are slid together or telescoped.

Consequently, in accordance with an additional feature of my invention and in order to obviate this disadvantage, I provide a central air vent passage one of the portions of the shaft and disposed coaxial to the respective shaft portions. Because the air vent passage is coaxial to the respective shaft portions and furthermore because of centrifugal forces arising during operation of the universal shaft, the lubricant in the lubricant chamber is flung radially outwardly and cannot escape through the air vent passage, more particularly, if the lubricant is preferably for a grease employed preferablyfor lubricating the splined connection and the pivot pin bearings.

Other features which are considered as characteristic for the invention are set forth in the appended claims.

Although the invention is illustrated and described herein as embodied in universal shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the embodiment of the invention when read in connection with the accompanying single FIGURE of the drawing showing in longitudinal view and in half section the universal shaft of my invention.

Referring now to the drawing, there is shown an universal shaft according to my invention formed of two coaxial parts 1 and 2 carrying at the outer ends thereof respectively a swivel joint 3, 4. The part 1 formed as a shaft portion 5 of solid construction at the inner end thereof, and the part 2 is formed as a hollow shaft portion 6 at the inner end thereof. The shaft portions 5 and 6 engage with one another by means of a splined connection or joint 7, the shaft portion 5 constituting the inner member of the splined connection and the hollow shaft portion 6 constituting the outer member of the splined connection. As can be readily seen from the figure, the splining permits relative axial movement of the shaft portions 5 and 6 but prevents relative rotation therebetween.

In the part 1 of the universal shaft, a collar 8 having a diameter greater than the outer diameter of the hollow shaft portion 6 in the vicinity of the splining 7 forms a transition between the solid shaft portion 5 and the swivel joint 3. A sheet metal sleeve 10 is secured by a weld 9 to the collar 8 and carries at the free end thereof an annular sealing casing 11. The sealing casing 11 is formed at the radially inner side thereof with an annular groove having a rectangular cross section, and a sealing ring 12 of substantially square cross section is seated within the annular groove. The sealing ring 12 is of the type aforementioned wherein the corners of the square-shaped cross section thereof are formed with sealing lips and a recess is formed in each of the lateral edges of the square. The sealing casing 11 is formed with an additional annular recess separated by a radially extending wall 13 from the annular groove in which the sealing ring 12 is located. In the additional annular recess there is received a scraper ring 14 having substantially the same outer and inner diameters as those of the sealing ring 12. The radially inner sealing lips of the rings 12 and 14 cooperate with and slidingly engage an outer peripheral surface 15 of the hollow shaft portion 6 located in the vicinity of the splining 7. The sealing ring 12 and the scraper ring 14 serve to seal off a chamber 16 formed by the assembly of the parts 1 and 2 and located between the sleeve 10 and the solid shaft portion 5 and including the interior of the hollow shaft portion 6, the chamber 16 being filled with a lubricating grease. If this lubricating chamber 16 were to have been completely sealed off from the surrounding atmosphere upon assembly of the parts 1 and 2 of the universal shaft, the pressure therein would have become excessive; accordingly, an air vent passage 17 is bored coaxially through a welding pin 18 to which the hollow shaft portion 6 is welded. The air vent passage 17 extends through a fork foot of the universal swivel joint 4, which is of unitary construction with the welding pin 18, so that the air vent passage 17 communicates with the outer atmosphere.

To eliminate the requirement for servicing of the universal swivel joints 3 and 4, they are provided with a construction described hereinafter only with regard to the swivel joint 3. It is obvious, of course, that the swivel joint 4 is of similar construction. As shown in the figure, the swivel joint 3 is provided with a spider member 20 which bears with the bearing pins 21 thereof through needle bearings 22 and cup-shaped bearing bushings 23 in fork arms 24 of the swivel joint 3.

In order to axially fix the spider member 20, end plates or discs 25, formed on both sides thereof with lubricating grooves, are disposed between the end faces of the spider member 20 and the bases of the bearing bushings 23. A contact seal 27 protected by a metal ring 26 is provided at the open end of each of the cup-shaped bearing bushings. A recess 28 forming a lubricant chamber is located at the center of the spider member 20 and is closed by a cylindrical cup-shaped cover member 29. The cylindrical wall of the cup-shaped cover member 29 resiliently abuts an inner peripheral wall surface of a recess 30 which surrounds the recess 28 and is secured therein by a curable or hardenable adhesive.

Bore passages 31 extend through the bearing pins 21 radially outwardly from the central recess 28 and connect the recess 28 to the bearing surfaces of the swivel joint 3. A filling screw 32 is provided in the center of the base of at least one of the bearing bushings 23 and cooperates with the respective passage 31 for filling the lubricating chamber formed by the recess 28 with lubricant.

Reference can be had to my copending application Ser. No. 862,268, 268, filed Sept. 30, 1969, for further details regarding a universal joint spider member of the type generally shown and described herein.

I claim:

1. Universal shaft comprising in combination two shaft portions having respective inner ends splined to one another so that said portions are nonrotatable though axially displaceable relative to one another, the surface material of at least one of said shaft portions at the splined connections between said shaft portions having relatively good antifriction and wearing properties; sealing means surrounding said splined shaft portions and enclosing a lubricant-filled inner chamber for said splined connection, said sealing means including a sealing ring and a scraper ring having located adjacent and coaxial to one another, said scraper ring having a scraping end facing outwardly and being scrapingly in engagement with one of said shaft portions; and a permanently lubricated swivel joint carried by each of said shaft portions at respective outer ends thereof, said swivel joints being universal joints each comprising a fork arm, cup-shaped bearing bushings carried by said fork arm, and a spider member supported on said fork arm by said cup-shaped bearing bushings, each spider member being provided with pivot pins, and including floating end plates formed with lubricant pockets on both sides thereof and consisting of a heat-stabilized highly crystalline and heat-resistant plastic material, said pivot pins bearing through said floating end plates against the bases of said cup-shaped bearing bushings.

2. Universal shaft according to claim 1 wherein the surface material of said one shaft portion is inductively hardened at the splined connection.

3. Universal shaft according to claim 1 wherein the surface material of said one shaft portion is softly nitrided at the splined connection.

4. Universal shaft according to claim 1 wherein the surface material in the form of a coating on said one shaft portion at the splined connection.

5. Universal shaft according to claim 4 wherein said plastic material is nylon.

6. Universal shaft according to claim 1 wherein said sealing ring has a substantially square cross section.

7. Universal shaft according to claim 9 including a lubricant chamber located at the center of each of said spider members, said lubricant chamber being sealed by a closure member and communicating through a lubricating channel with a bearing space for the respective spider member.

8. Universal shaft according to claim 7 wherein said lubricant chamber has an opening surrounded by a recess, said closure member comprising a cover force-lockingly and form-lockingly received in said recess.

9. Universal shaft according to claim 1 wherein one of said shaft portions is formed with a central air vent passage.

* * * * *